(12) United States Patent
Zurek et al.

(10) Patent No.: US 11,213,152 B2
(45) Date of Patent: Jan. 4, 2022

(54) HIGH TEMPERATURE THERMOSTABLE FOODSERVICE TRAY

(71) Applicant: HAVI Global Solutions, LLC, Downers Grove, IL (US)

(72) Inventors: Jonathan Paul Zurek, Batavia, IL (US); Jonathon James William Beach, Glen Ellyn, IL (US)

(73) Assignee: HAVI GLOBAL SOLUTIONS, LLC

( * ) Notice: Subject to any disclaimer, the term of this patent is extended or adjusted under 35 U.S.C. 154(b) by 34 days.

(21) Appl. No.: 16/702,378

(22) Filed: Dec. 3, 2019

(65) Prior Publication Data

US 2020/0100611 A1 Apr. 2, 2020

Related U.S. Application Data

(62) Division of application No. 15/947,164, filed on Apr. 6, 2018.

(51) Int. Cl.
| | | |
|---|---|---|
| *A47G 23/06* | (2006.01) | |
| *B32B 27/10* | (2006.01) | |
| *B32B 29/00* | (2006.01) | |
| *B32B 27/36* | (2006.01) | |
| *B32B 7/04* | (2019.01) | |

(52) U.S. Cl.
CPC .............. *A47G 23/06* (2013.01); *B32B 7/04* (2013.01); *B32B 27/10* (2013.01); *B32B 27/36* (2013.01); *B32B 29/002* (2013.01); *B32B 2250/04* (2013.01); *B32B 2307/306* (2013.01); *B32B 2307/4023* (2013.01); *B32B 2367/00* (2013.01); *B32B 2439/02* (2013.01)

(58) Field of Classification Search
CPC .......... A47G 23/06; B32B 7/04; B32B 27/10; B32B 27/16; B32B 29/002; B32B 2250/04; B32B 2307/306; B32B 2307/4023; B32B 2367/00; B32B 2439/02
USPC ......... 428/34.2, 342, 414, 475.2; 206/524.3; 220/62.22, 62.11, 62.13; 229/5.81, 903
See application file for complete search history.

(56) References Cited

U.S. PATENT DOCUMENTS

| | | | |
|---|---|---|---|
| 3,924,013 | A | 12/1975 | Kane |
| 4,147,836 | A | 4/1979 | Middleton et al. |
| 4,543,280 | A | 9/1985 | Fujita et al. |

(Continued)

FOREIGN PATENT DOCUMENTS

| | | | |
|---|---|---|---|
| WO | WO 2016/207587 | A1 | 12/2016 |
| WO | WO 2019/194818 | A1 | 10/2019 |

OTHER PUBLICATIONS

ASTM Standard, "Standard Test Method for Peel Resistance of Adhesive (T-Peel Test)", D1876-08, 2015 (Year: 2015).*

(Continued)

*Primary Examiner* — Ruiyun Zhang
(74) *Attorney, Agent, or Firm* — Neal, Gerber & Eisenberg LLP

(57) ABSTRACT

An example disposable food service tray that can withstand high heat is disclosed. The disposable food tray includes a first layer comprising paper board, and a second layer comprising polyethylene terephthalate (PET) affixed to the first layer, wherein an adhesion between the first layer and the second layer is configured to withstand a temperature of up to 525 degrees Fahrenheit for up to six minutes without blistering.

21 Claims, 10 Drawing Sheets

(56) References Cited

U.S. PATENT DOCUMENTS

| | | |
|---|---|---|
| 4,595,611 A | 6/1986 | Quick et al. |
| 6,228,201 B1 | 5/2001 | Cooper et al. |
| 2005/0048300 A1 | 3/2005 | Mason et al. |
| 2014/0084011 A1 | 3/2014 | Sanders |
| 2019/0307276 A1 | 10/2019 | Zurek et al. |

OTHER PUBLICATIONS

The United States Patent and Trademark Office, Notification of Transmittal of The International Search Report and The Written Opinion of The International Searching Authority, or The Declaration (Jul. 13, 2018).

* cited by examiner

HIGH TEMPERATURE THERMOSTABLE FOODSERVICE TRAY

CROSS REFERENCE TO RELATED APPLICATION

This application is a divisional of U.S. patent application Ser. No. 15/947,164, filed on Apr. 6, 2018, which is incorporated by reference herein in its entirety.

TECHNICAL FIELD

The present disclosure generally relates to high temperature food preparation, and, more specifically, methods, systems, and apparatuses corresponding to high temperature disposable foodservice trays.

BACKGROUND

Restaurants and other foodservice locations often include accelerated cooking ovens, using a variety of heating sources to heat food with better quality than a microwave. These locations generally use metallic trays or cookware to hold food while it is being heated.

Some locations may use disposable foodservice trays that can be heated and served to a customer without requiring a transfer from one tray to another. However these trays may be limited to heating using a particular temperature or duration of heating, to prevent the disposable tray from melting, charring, or becoming unusable as a foodservice tray.

Dual-ovenable trays (i.e., trays suitable for use in both a conventional oven and a microwave oven) on the market today are generally deemed safe at temperatures below 400 degrees Fahrenheit for up to 60 minutes. Heating foods at lower temperatures may limit the customer to traditional ovens and microwaves and as a result, a longer cook time. Heating in reusable cookware requires additional time prepping the food before and after heating and can diminish the food presentation because the food requires transferring. Further, additional costs associated with cleaning (i.e., water, cleaning products, etc.) is often required. Food prepared in reusable cookware is often multiple servings, which adds complexity in managing the shelf-life and storage of unused food product and an increase in food waste. The additional handling required can increase the susceptibility of cross contamination and the risk of foodborne illnesses.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown describing a high heat thermostable disposable food service tray. An example disposable food tray includes a first layer comprising paper board having a first side and a second side. The disposable food tray also includes a second layer comprising polyethylene terephthalate (PET), wherein the second layer is affixed the first side of the first layer with a peel adhesion force of greater than 60 grams per inch. The disposable tray further includes a third layer comprising a high heat ink, wherein the third layer is applied to the second side of the first layer. And the disposable food tray yet further includes a fourth layer comprising a moisture barrier, wherein the fourth layer is applied to the second side of the first layer after the third layer is applied.

An example method of forming a disposable food tray includes forming, generating, or otherwise creating a first layer comprising paper board, and affixing a second layer to the first layer, the second layer comprising polyethylene terephthalate (PET), wherein an adhesion between the first layer and the second layer is configured to withstand a temperature of up to 525 degrees Fahrenheit for up to six minutes without blistering.

Another example disposable food tray includes a first layer comprising paper board, and a second layer comprising polyethylene terephthalate (PET) affixed to the first layer, wherein an adhesion between the first layer and the second layer is configured to withstand a temperature of up to 525 degrees Fahrenheit for up to six minutes without blistering.

Example embodiments are also shown describing a method of testing adhesion including forming a strip comprising a first layer affixed to a second layer. The method also includes separating a first portion of the first layer from a first portion of the second layer. The method further includes attaching the first portion of the first layer to a first testing member, and attaching the first portion of the second layer to a second testing member. The method still further includes measuring a force applied as the first member is drawn away from the second member. And the method yet further includes determining a peel adhesion force between the first layer and the second layer based on the measured force.

Another method of testing adhesion includes forming a strip comprising a first layer affixed to a second layer. The method also includes attaching the first layer to a first testing member, and attaching the second layer to a second testing member. The method further includes measuring a force applied as the first member is drawn away from the second member. And the method yet further includes determining a peel adhesion force between the first layer and the second layer based on the measured force.

Example embodiments are also shown describing a method of using a disposable food tray including inserting food into a disposable food tray, wherein the disposable food tray comprises a first layer comprising paper board and a second layer comprising polyethylene terephthalate (PET) affixed to the first layer. The method also includes inserting the disposable food tray into an oven, heating the disposable food tray at a temperature up to 525 degrees for a duration up to six minutes, removing the disposable food tray from the oven, and serving the disposable food tray to an individual.

An example system includes a disposable food tray comprising a first layer and a second layer, and an oven configured to provide heat greater than 500 degrees for longer than six minutes, wherein an adhesion between the first layer and the second layer is configured to withstand a temperature of up to 525 degrees Fahrenheit for up to six minutes without blistering.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
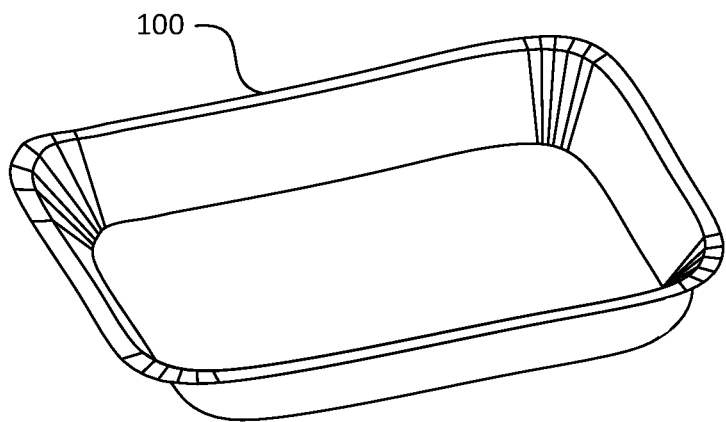
FIG. 1 illustrates an example disposable food tray according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, some restaurants and other foodservice locations make use of accelerated cooking ovens in order to prepare food. These accelerated cooking ovens provide heat at greater than conventional oven temperatures in order to heat food in a reduced amount of time and with an improved quality. Typical temperatures may be greater than 500 degrees Fahrenheit, sometimes up to 525 degrees or more. Food may be heated in these ovens for several minutes at a time. Typical heating durations can depend on the food being prepared, the temperature used, and many other factors, and may range from 1 minute or less, up to 10 minutes or more, typically falling in the range of 4-7 minutes.

In order to heat the food at these temperatures, many foodservice locations make use of metal, ceramic, or other materials that will not burn or experience other ill effects in the ovens. Alternatively, if disposable food trays are used, some foodservice locations may include limits on the time and/or temperature that can be used.

Where metal or other non-disposable materials are used, the prepared food often needs to be transferred to a disposable tray or secondary tray for serving to a customer. This can increase costs, and can cause injury if heat is retained in the heated tray and grabbed by a person serving the food.

As noted above, some foodservice locations use disposable paper trays in order to decrease the cost of preparing and serving food. However typical disposable paper trays are limited in the temperature and time that they can be heated in an oven. For instance, a typical temperature limit may be 400 degrees Fahrenheit, and a typical heating time may be anything up to 60 minutes. As a result, food prepared at this limited temperature may have a reduced quality, and/or may require additional time to be heated compared to an oven that is limited at 450 degrees or higher. And further, where a foodservice location has many orders being prepared at once or in rapid succession, the overall throughput of the oven is reduced, resulting in fewer customers served per given time period.

With these issues in mind, example embodiments of the present disclosure may provide a disposable food tray that can withstand greater temperatures for longer periods of time than conventional disposable food trays. In addition, example embodiments disclosed herein provide testing methods to determine whether a sample disposable food tray can withstand the higher temperatures and longer heating times. Further, example embodiments disclosed herein include methods and systems for using the high temperature disposable food tray described herein.

The disposable food tray described herein may facilitate the use of a centralized facility for food preparation, packaging, heat sealing, freezing, and/or shipping to ensure consistent food quality and control. The embodiments described herein may also reduce food waste, and improve food quality for single serve offerings, allowing the food to be quickly heated using an accelerated cooking oven rather than a traditional microwave. Less equipment may be required, due to the ability to heat each serving on demand without needing to preserve heat for extended periods of time. And various embodiments may enable expanded menu item opportunities for a given location without requiring additional equipment for preparing, heating, and holding the new menu items.

An example disposable food tray includes several layers of material, affixed to each other such that the food tray can withstand temperatures up to 525 degrees for up to six minutes without the layers separating or blistering, and without adverse effects on any food contained in the tray. The layers are discussed in further detail below.

In order to determine whether a given food tray is suitable for high temperature food preparation (e.g., greater than 500 degrees) a testing method may be used. The testing method can include determining whether an adhesion between layers of the disposable food tray is sufficient to prevent blistering or separation under the high heat. The testing method also includes determining a peel adhesion force by separating a portion of the disposable food tray into layers, attaching the separated layers to testing members while leaving a portion of the layers attached, and measuring a force required to peel the layers apart. This is discussed in further detail below.

Further embodiments disclosed herein include methods and systems of using the high heat disposable food tray shown and described herein. The embodiments include methods for preparing food using the disposable food tray by heating the tray to higher than 500 degrees for longer than six minutes, without the disposable tray burning or separating into layers (i.e., blistering). These embodiments are discussed in further detail below.

FIG. 1 illustrates an example food service tray 100 according to embodiments of the present disclosure. Tray 100 may have various shapes, colors, sizes, depths, and other characteristics. For instance, tray 100 may have a generally square or rectangular shape, may be a circle, oval, or any other shape. Further, tray 100 may have rounded edges, and may have different depths and angled sides. For instance, a bottom, closed side can be smaller than an open, top side such that the tray walls are angled outward as shown in FIG. 1.

Tray 100 may be used in one or more methods disclosed herein, and can include one or more layers configured to perform different functions, such as providing structure and pliability, moisture retention or prevention, coloring, preventing transmission of materials into food contained in tray, and more. These layers and functions are discussed in further detail below.

Figure 2:
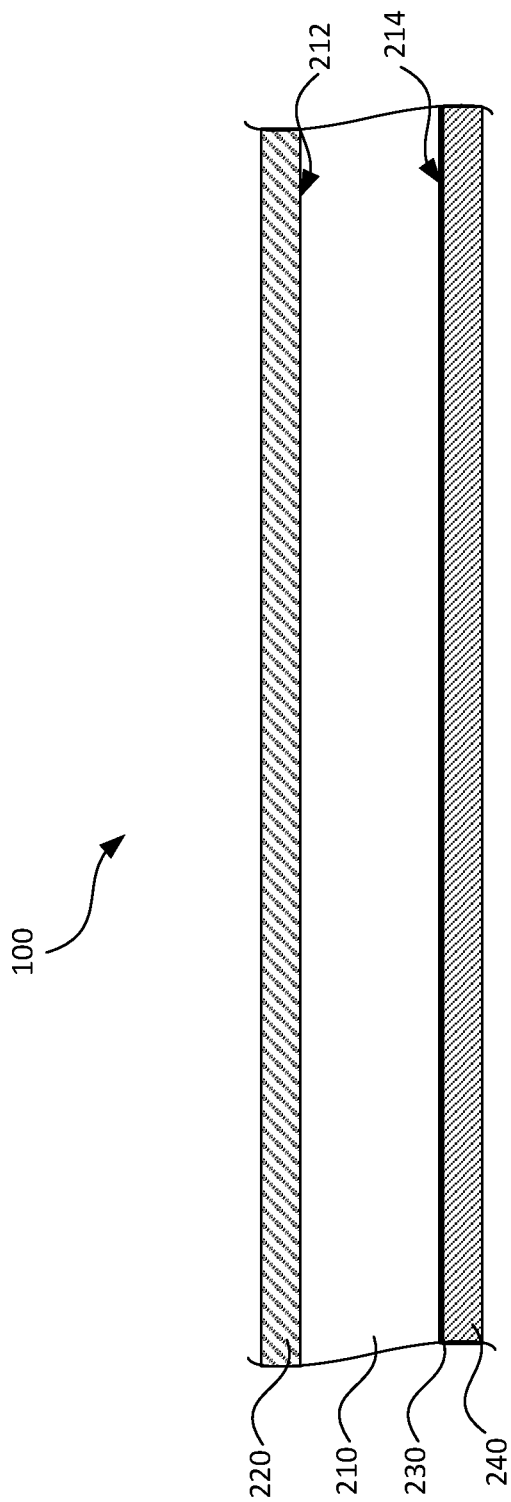
FIG. 2 illustrates and example cross section view of the disposable food tray of FIG. 1.

FIG. 2 illustrates a cross-section perspective view of various layers of the disposable food tray 100 of FIG. 1. For example, tray 100 includes four layers, a first layer 210, second layer 220, third layer 230, and fourth layer 240. In some examples tray 100 may include more or fewer layers.

Each layer can have a particular purpose or particular function with respect to the overall tray 100. And in some examples, one or more layers include sublayers (e.g., the fourth layer may comprise two or more sublayers).

In some examples, each layer 210-240 has one or more properties, such as a thickness, color, material, moisture content, and more. Further, each layer can have particular properties at various times during the manufacturing process, and these properties may change over time and as the various stages of the manufacturing process are carried out. For instance, a starting thickness and an ending thickness of the first layer may be different as one or more other layers are added.

In some examples, a moisture level of the various layers changes during the manufacturing process. The specific moisture level of each layer may affect one or more resulting properties of the tray 100, and as such can be tailored to specific levels during manufacturing to provide the sought after characteristics. The moisture level may thus start at a first level, and increase and/or decrease at various points during manufacturing process The first layer 210 in FIG. 2 is paper board, having a first side 212 and a second side 214. The paper board may be a solid bleached sulphate (SBS), comprising a bleached chemical pulp. Other materials may be used as well. The first layer 210 is the initial or starting layer in the manufacturing process of tray 100, which begins by molding the paper board into a sheet.

The first side 212 of the first layer 210 may be a "wire" side, and the second side 214 may be a "felt" side. The wire side and felt side are created during the formation of the paper board first layer. Each side has one or more distinct characteristics, such as a surface roughness, heat transfer ability, reactivity with certain chemicals, coefficient of friction, hardness, electrical properties, visual properties, and/or various other characteristics. Each characteristic may impact an adhesion between the first layer and one or more other layers, which in turn impacts an overall ability of the disposable tray to withstand high temperatures. Further, the characteristics impact whether any layer materials or outside materials propagate into food contained within the tray during heating and serving of the food.

In some examples, the first layer 210 has a thickness of 0.024 inches. This is otherwise known as "24 point" board or paper board. Other thicknesses may be used as well. In some examples the thickness of the first layer is uniform across the sheet and/or resulting tray, while in other examples the thickness varies over the area of the paper board.

The thickness of the first layer 210 provides rigidity and structure to the tray, such that the tray does not bend or deform more than intended under the stress of oven heat and carrying food. The thickness of the first layer 210 also impacts the moisture content of the resulting tray, as well as the blistering or other effects during heating of the tray.

It should be noted that other thicknesses may be used as well. Greater thicknesses provides added structure and rigidity, however may not be as easily formed into the tray shape intended at the later stages of manufacturing. Further, too great a thickness may increase material costs and add complexity to the manufacturing process. And too small a thickness can result in a flimsy disposable tray, not able to properly carry food and provide support. Too small a thickness can also result in blistering or other layer adhesion problems as well.

In some examples, the first layer 210 has a particular moisture level when it is formed. For instance, the moisture level may be between 4-7%, although it should be noted that other moisture levels may be used as well. In some examples the moisture is between 5-6%.

The next step in forming the disposable food tray includes affixing the second layer 220 to the first layer 210. The second layer 220 may be affixed to the first layer 210 by extruding the first layer 210 through the second layer 220, or otherwise causing the second layer 220 to be affixed, applied, or adhered to one side of the first layer 210.

In some examples, the second layer 220 comprises polyethylene terephthalate (PET). The second layer 220 may have a particular color due to one or more pigments. For instance, the second layer 220 can be black, brown, white, or some other color.

The second layer 220 may be affixed to the first side 212 of the first layer 210 (i.e., the wire side). Alternatively, the second layer 220 may be affixed to the second side 214 of the first layer 210 (i.e., the felt side). Typical disposable trays are usually formed by adding the PET to the felt side. However embodiments of the present disclosure may include affixing the PET second layer to the wire side instead. This can provide improved adhesion between the layers, and/or reduce blistering.

The second layer may begin as a heated material applied to the first layer 210 in the heated state. The heated state of the material may assist in providing the proper adhesion between the layers. Further, during adhesion to the first layer 210, the second layer 220 can have a particular moisture level that impacts the adhesion. Changing the moisture level can include adding or removing moisture from the PET until the moisture level is near 0.003%. In some cases, the moisture is reduced to 0.002%. In other examples, the PET may be dried to any moisture level less than 0.003%, or 0.002%. It should be noted that other moisture levels may be used as well.

In some examples, the application of the second layer 220 adds crystallinity to first layer 210, which increases the structural integrity and aids in preventing blistering between the first and second layers during heating in an oven. The added crystallinity may enable the tray to withstand temperatures up to 525 degrees without blistering.

In some examples, a black pigment may be included in the PET second layer 220. Black pigment may be preferable to white pigment, due to the reaction of the pigment to high temperatures and the resulting adhesion properties. This in turn can affect whether or not blistering between the layers occurs under high temperatures.

The black PET pigments can be a black high heat pigment configured to be heat resistant to temperatures greater than 500 degrees Fahrenheit. This means that the black pigment does not adversely impact the adhesion between the PET and the first layer when heated above 500 degrees. It may also mean that the ink does not change color when exposed to heat greater than 500 degrees.

In some examples, the second layer 220 may be affixed to the first layer 210 with a peel adhesion force greater than 60 grams per inch. In some embodiments, the peel adhesion force is greater than 100 grams per inch. The peel adhesion force is discussed in more detail below.

The second layer 220 may be added to a first layer 210 having a moisture level of about 5-6%. After the second layer 220 is added to the first layer 210, the moisture level may be increased. In some examples, the moisture level may be increased to between 9-11%. In other examples, the moisture level may be increased to 10% plus or minus 0.5%.

Lower moisture may be needed during application of second layer 220 to first layer to ensure proper adhesion between the layers. But after the first and second layers have been affixed to each other, increased moisture assists in pliability and forming of trays. The added moisture may further assists in ensuring proper application of the third and/or fourth layers, as discussed below.

The adhesion between the first and second layers is configured to withstand temperatures of up to 525 degrees Fahrenheit for up to six minutes without blistering. Blistering generally occurs when the tray is heated to a high temperature and the bond or adhesion between two layers is undone, causing bubbles to appear. Blistering can be caused by moisture in the layers heating up, turning into gas, and expanding between layers, causing a bubbling to appear. This bubbling or blistering can have adverse effects on the integrity of the tray, by causing structural issues, imparting unwanted chemicals or materials into the food in the tray, and causing the tray to look defective, all of which can result in a negative user experience.

When examples are described herein referring to layers, adhesion, or trays configured to withstand high heat "without blistering," that can refer to situations in which no visible or noticeable blistering occurs. For instance, that can mean that no bubbling larger than one mm is present, or less than a given percentage of a bottom of the tray experiences blistering (e.g., <1%).

As noted above, blistering can cause issues with a given tray by decreasing the structural integrity of the tray, increasing the likelihood of the layer materials entering the food in the tray, and being generally visually unappealing. In some examples, the layers, adhesion, and trays may be configured to withstand high temperatures without the presence of any of these visual or structural issues, even if a minimal amount of blistering still occurs. For instance, a given tray may experience minimal blistering that does not affect the structural integrity, does not cause any layer materials to enter the food, and does not cause any visual issues. As such, some examples may not prevent all blistering, but instead may reduce or aid in preventing substantial or significant blistering from occurring.

After the second layer 220 is added to the first layer 210, the third layer 230 is then be added to the second side 214 of the first layer 210. The third layer 230 may be applied in any appropriate manner.

In some examples, the third layer 230 is a high heat resistant black ink, configured to withstand temperatures up to 525 degrees for up to six minutes without migrating into the other layers or food contained in the tray. Black ink may be used for third layer 230 because it prevents noticeable discoloration from occurring during and after heating in an oven at high temperatures above 500 degrees. Further, the black high heat ink used may not have an off-odor, in which the heated ink causes an unwanted odor or smell. Brown ink or other colors may be used as well. Some inks may also change color due to high temperature, such as a brown ink turning green.

In some examples, the third layer 230 is applied to a combined first and second layers having a moisture level of between 9-11%. Too low of a moisture level may cause problems in forming trays, because a low moisture material is prone to brittleness and cracking. Similar issues may arise for the end product used by customers as well (e.g., brittleness and cracking). But too high a moisture level can result in blistering, because the moisture expands when heated to high temperatures. As such, a middle level of moisture may be used.

After the third layer 230 is applied, a fourth layer 240 is applied. The fourth layer 240 may be applied on top of the third layer 230, to the second side 214 of the first layer 210 as shown in FIG. 2, in any suitable manner.

The fourth layer 240 can comprise a moisture barrier layer, configured to prevent the tray from becoming soggy and absorbing too much moisture. The fourth layer 240 may be a single layer, or may be multiple layers. A typical disposable food tray includes multiple moisture barrier layers, to prevent moisture from seeping into the tray. The disposable tray of this disclosure, however, may only include a single moisture barrier layer, to balance the need for moisture to escape to prevent blistering at high temperatures.

The fourth layer 240 allows moisture from the first and/or second layers to escape during heating, while still preventing significant moisture from being absorbed into the tray and affecting the structure of the tray. As such, the fourth layer 240 balances preventing external moisture from being absorbed by the tray, while still allowing moisture from the tray layers to escape during heating in order to prevent blistering. If moisture is trapped between fourth layer 240 and second layer 220, blistering may occur.

After the fourth layer is added, the resulting material is cut into the appropriate shape for the disposable food tray. As noted above, this may be a square, rectangle, circle, or some other shape. The cut material is then scored and molded into the proper shape.

Figure 3:
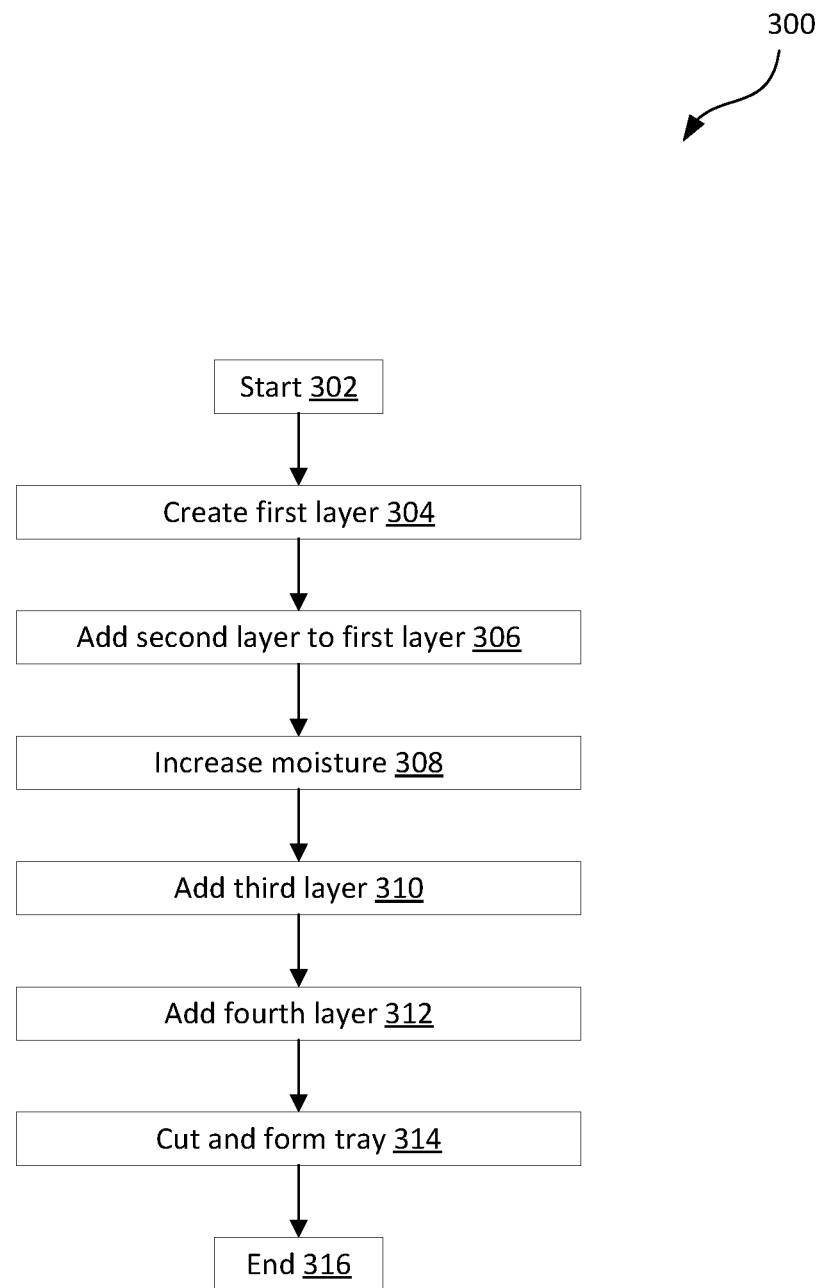
FIG. 3 illustrates a flowchart of an example method according to embodiments of the present disclosure.

FIG. 3 illustrates an example method 300 according to embodiments of the present disclosure. Method 300 enables the forming of a disposable food tray having characteristics described in this disclosure including the ability to withstand high temperatures (e.g., up to 525 degrees for up to six minutes) without blistering. The flowchart of FIG. 3 is representative of machine readable instructions that may be stored in a memory and may include one or more programs which, when executed by a processor may cause one or more computing devices to carry out one or more functions described herein. While the example program is described with reference to the flowchart illustrated in FIG. 3, many other methods for carrying out the functions described herein may alternatively be used. For example, the order of execution of the blocks may be rearranged or performed in series or parallel with each other, blocks may be changed, eliminated, and/or combined to perform method 300. Further, because method 300 is disclosed in connection with the components of other Figures of this disclosure, some functions of those components will not be described in detail below.

Method 300 starts at block 302. At block 304, method 300 includes creating a first layer. This first layer may be the first layer 210 described above with respect to FIG. 2. At block 306, method 300 includes adding a second layer to the first layer. The second layer may be the second layer 220 described above. Adding the second layer may include heating the second layer material to a sufficiently high temperature, and extruding it onto the first layer in order to adhere the second layer to the first layer. Further, each of the first layer and second layer may have a particular moisture level or other characteristic during this process.

At block 308, method 300 includes increasing the moisture of the combined first and second layers. This enables the combined first and second layers to better adhere to the third layer at block 310. The third layer may be the third layer 230 described above.

At block 312, method 300 includes adding a fourth layer, which may be the moisture barrier layer 240 described above. The moisture barrier layer enables the tray to emit some moisture during heating to prevent blistering, while preventing moisture from being absorbed and causing the tray to be flimsy or lack structural support.

At block 314, method 300 includes cutting and forming the disposable food tray. This may include cutting out a particular shape, scoring the cut material, and molding or forming it into the desired tray shape. Method 300 may then end at block 316.

The blocks above have been described with respect to the layers of FIG. 2. However it should be noted that layers may be excluded or added to the process, and that various characteristics of the materials of the layers may be changed, as indicated in this disclosure.

FIGS. 4-8 focus on methods for determining the peel adhesion force between two layers of material. In some examples, the two layers of material may be the first layer 210 and the second layer 220 described above. However it should be noted that other materials and layers may be used as well.

Figure 4:
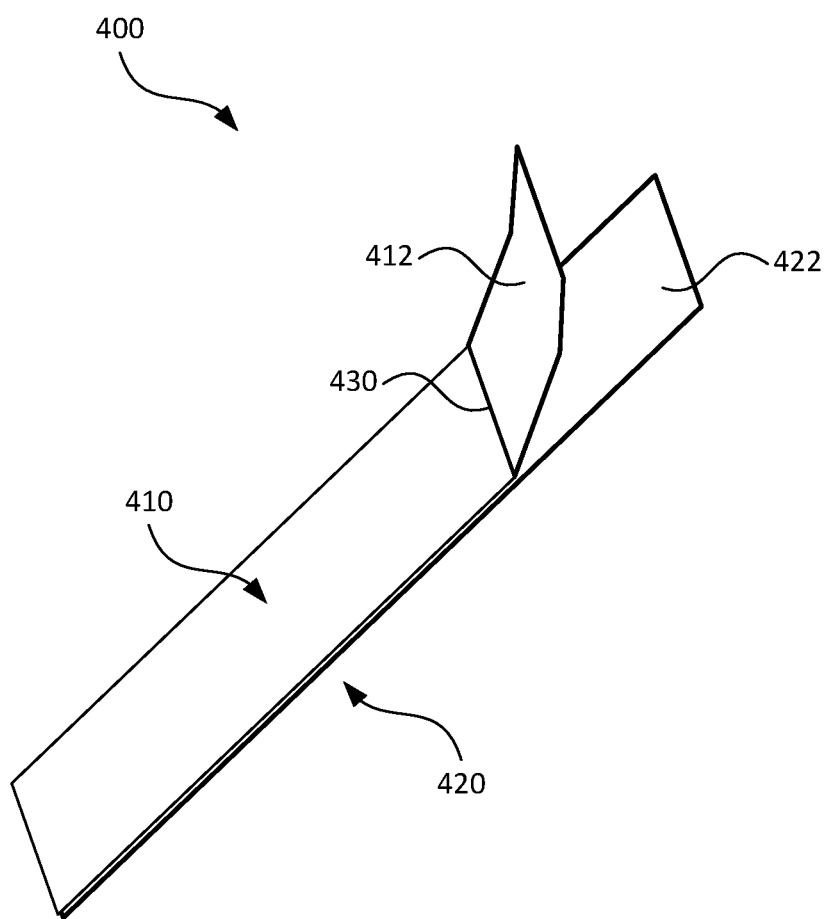
FIG. 4 illustrates an example testing strip according to embodiments of the present disclosure.

FIG. 4 illustrates an example testing strip 400 according to embodiments of the present disclosure. The testing strip 400 may be used in one or more of the methods described herein to test an adhesion property between the layers of the strip. In some examples, when the first, second, third, and/or fourth layers are added to each other as described above, it may be beneficial to test the resulting material to determine whether the adhesion properties between two or more layers are sufficient. A sufficient adhesion force of greater than 60 grams per inch (or more) indicates that the material can withstand temperatures of up to 525 degrees for up to six minutes without blistering.

As such, when a batch of tray material is produced, adhesion between the layers may be tested, prior to or during the final step of forming the trays. If the adhesion is determined to be too low or insufficient, the batch of material may be discarded. In some examples, the adhesion between the first and second layers may be tested prior to adding the third and/or fourth layers.

The first step in testing the adhesion includes forming a strip 400 comprising a first layer 410 affixed to a second layer 420. The first layer 410 may be similar or identical to the first layer 210 described above, and the second layer 420 may be similar or identical to the second layer 220 described above.

The next step includes separating a first portion 412 of the first layer 410 from a second portion 422 of the second layer 420. This is shown in FIG. 4. The line 430 may be an edge of adhesion between the first layer 410 and the second layer 420, which is the point or line at which the first portions 412 and 422 meet. This edge of adhesion may generally be a straight light across the strip 400. In some examples, the first portions 412 and 422 may be separated using a knife or other sharp instrument to pull the layers apart.

In some examples, the strip 400 is generally rectangular in shape, and may be several inches long. In the illustrated example of FIG. 4, the strip 400 are six inches long by one inch wide. And the first portion 412 of the first layer 410 and the first portion 422 of the second layer 420 may be an amount less than the full strip. In the illustrated example, the portions 412 and 422 are be approximately one and a half inches long by one inch wide. It should be noted that other distances and sizes may be used as well.

Figure 5:
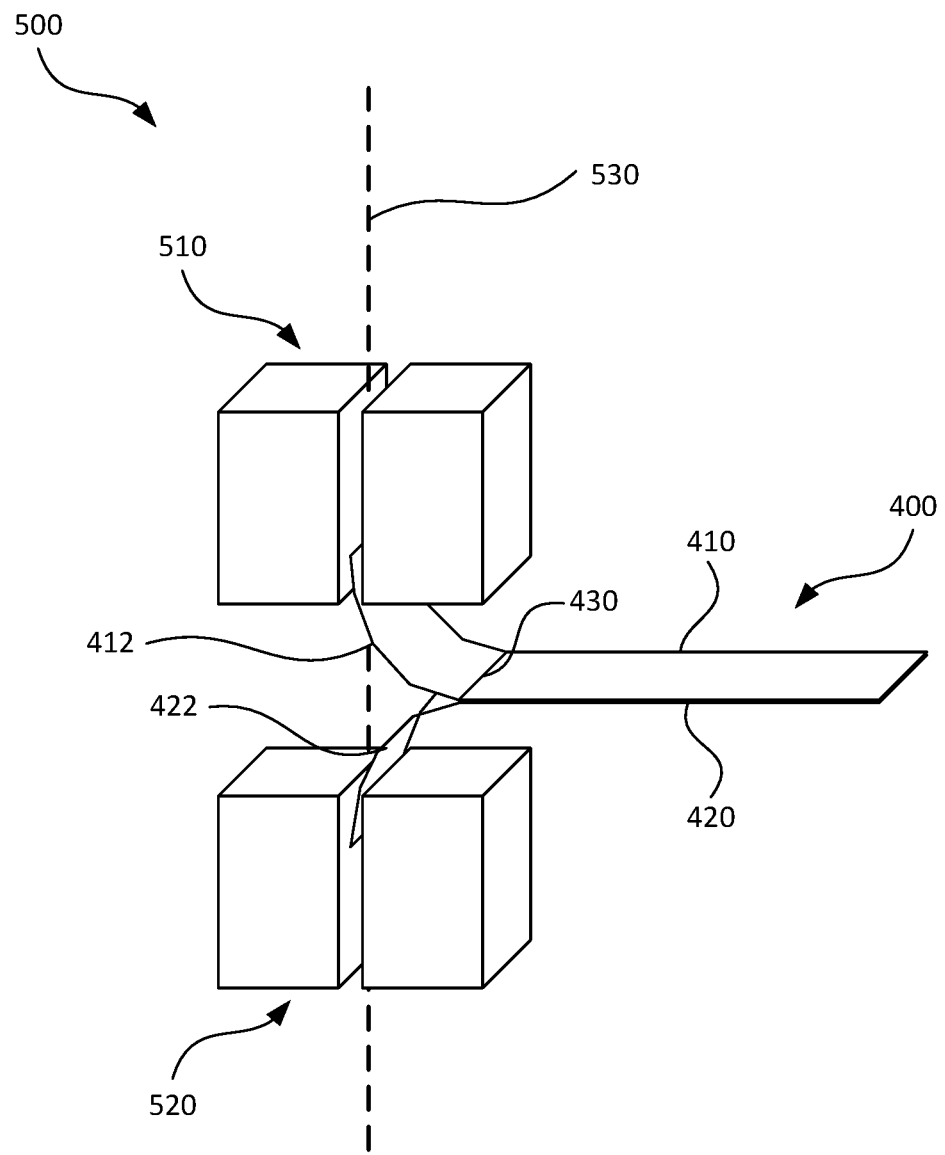
FIG. 5 illustrates an example testing scenario according to embodiments of the present disclosure.

FIG. 5 illustrates an example testing apparatus setup 500. The setup 500 may be used to determine the peel adhesion force of testing strip 400. The peel adhesion force corresponds to a force required to separate the layers of the strip, or to "peel" one layer off of another.

The setup 500 includes a first testing member 510 and a second testing member 520. Each testing member may include one or more components configured to grab or hold onto the first portion 412 and 422 respectively of the strip 400. FIG. 5 illustrates each testing member having two blocks configured to clamp together to grab and hold onto the respective first portions 412 and 422. Each testing member may be configured to move along the testing axis 530.

After the strip 400 is prepared by separating the first portion 412 from the second portion 422, the next step in the adhesion testing includes attaching the first portion 412 of the first layer 410 to the first member 510, and attaching the first portion 422 of the second layer 420 to the second member 520. Once attached, the slack is drawn out of the strip such that the first portions 412 and 422 are 180 degrees apart and parallel with the testing axis 530. This may be done by moving one or both of the testing members 510 and 520 away from each other along the testing axis 530 while retaining the first portions 412 and 422 in the respective testing members.

Once the slack is removed, the next step includes separating the testing members to peel the first layer 410 apart from the second layer 420. Separating the testing members 510 and 520 can include keeping one testing member stationary while the other testing member is drawn away along the testing axis 530. Alternatively, it can include drawing both testing members apart along the testing axis 530.

As noted above, in some examples, testing members 510 and 520 may first be moved apart to remove slack, such that the angle between first portions 412 and 422 is 180 degrees. In this scenario the edge of adhesion 430 may also be moved in line with and perpendicular to the testing axis 530. As such, when the testing member(s) are moved apart along the testing axis 530, the edge of adhesion 430 remains relatively stationary with respect to the testing axis 530.

Testing apparatus 500 may include one or more sensors (not shown) configured to measure a force acting on either or both of the testing members. This measured force corresponds to the force resisting movement of the members as they are separated (i.e., the force holding the first layer 410 to the second layer 420. The force may be measured as the members are separated, or as the first member is drawn away from the second member.

In some examples, the first member is drawn away from the second testing member 520 at a rate of two mm per second for a distance of 70 mm. This may be a testing trial that takes place over about 35 seconds. The measured force over time is analyzed to determine a peel adhesion force between the first and second layer.

Figure 6:
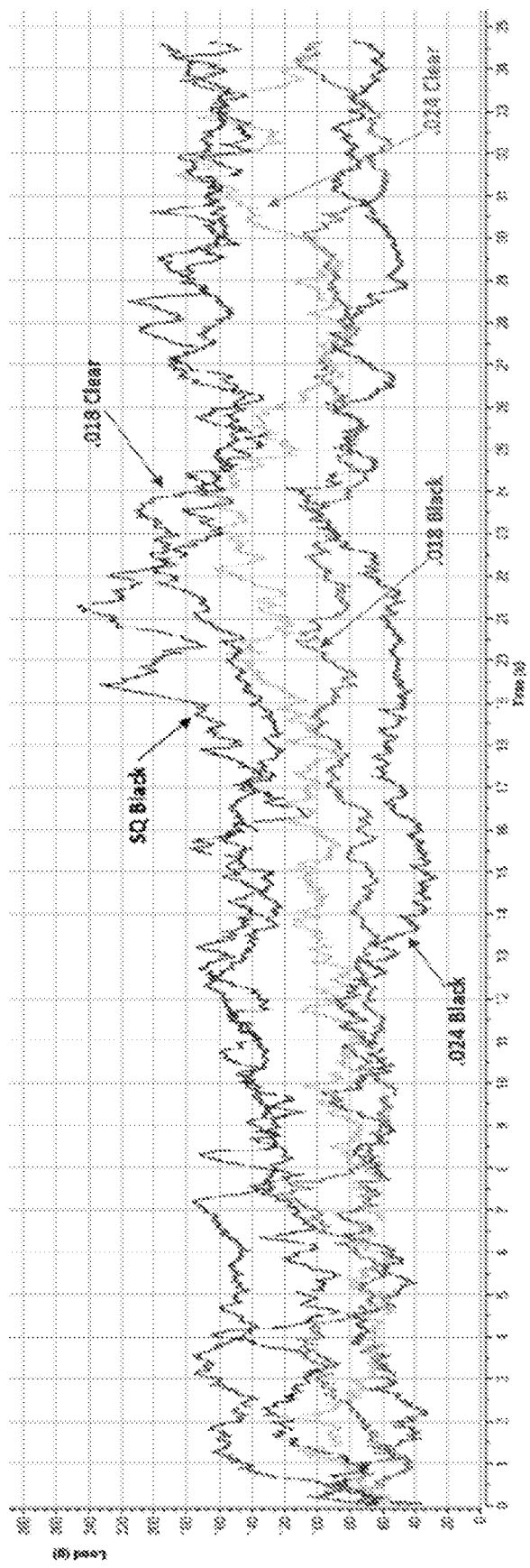
FIG. 6 illustrates an example graph of the measured force according to embodiments of the present disclosure.

FIG. 6 illustrates an example graph of the force during testing of 5 different strips. Each strip was tested having a width of one inch. As can be seen in FIG. 6, the X axis represents time and the Y axis represents the measured force (i.e., the force acting on first testing member 510). Because each tested strip was one inch wide the force can thus be understood as a force per inch of cross section or width of the tested strip. And as such, there may be a one-to-one ratio of the measured force to the determined peel adhesion force. Alternatively, if a smaller width testing strip is used (e.g., one half inch wide), then the measured force may be half or some other ratio of the determined peel adhesion force.

Determining the peel adhesion force between the layers can be done in several ways. In some examples, the force is measured over time and averaged. In the illustrated example of FIG. 6, this includes averaging the Y axis values over a given time period to determine an average peel adhesion force of the given sample. Alternatively, the determined peel adhesion force may include a peak or minimum force measured during a given time interval. In other examples, determining the peel adhesion force can include discarding portions of the measured force.

In some examples, the measured force is separated into stages. Determining peel adhesion force can include measuring the force acting on the first testing member 510 during a first stage, a second stage, and a third stage. The first stage may comprise a first duration of time during which the first member is drawn away from the second member (e.g., t=0 to t=5), the second stage may comprise a second duration of time following the first duration (e.g., t=5 to t=30), and the third stage may comprise a third duration of time following the second duration (e.g., t=30 to t=35). In order to determine the peel adhesion force, only the force measured during the second stage may be used. This can provide a more accurate and uniform result.

In some examples measured force is may be 60 grams/inch. This may be a sufficient adhesion force such that blistering does not occur. In other examples, the peel adhesion force must be greater than 100 grams per inch in order to ensure that blistering does not occur when a tray is exposed to temperatures up to 525 degrees for up to six minutes.

Figure 7:
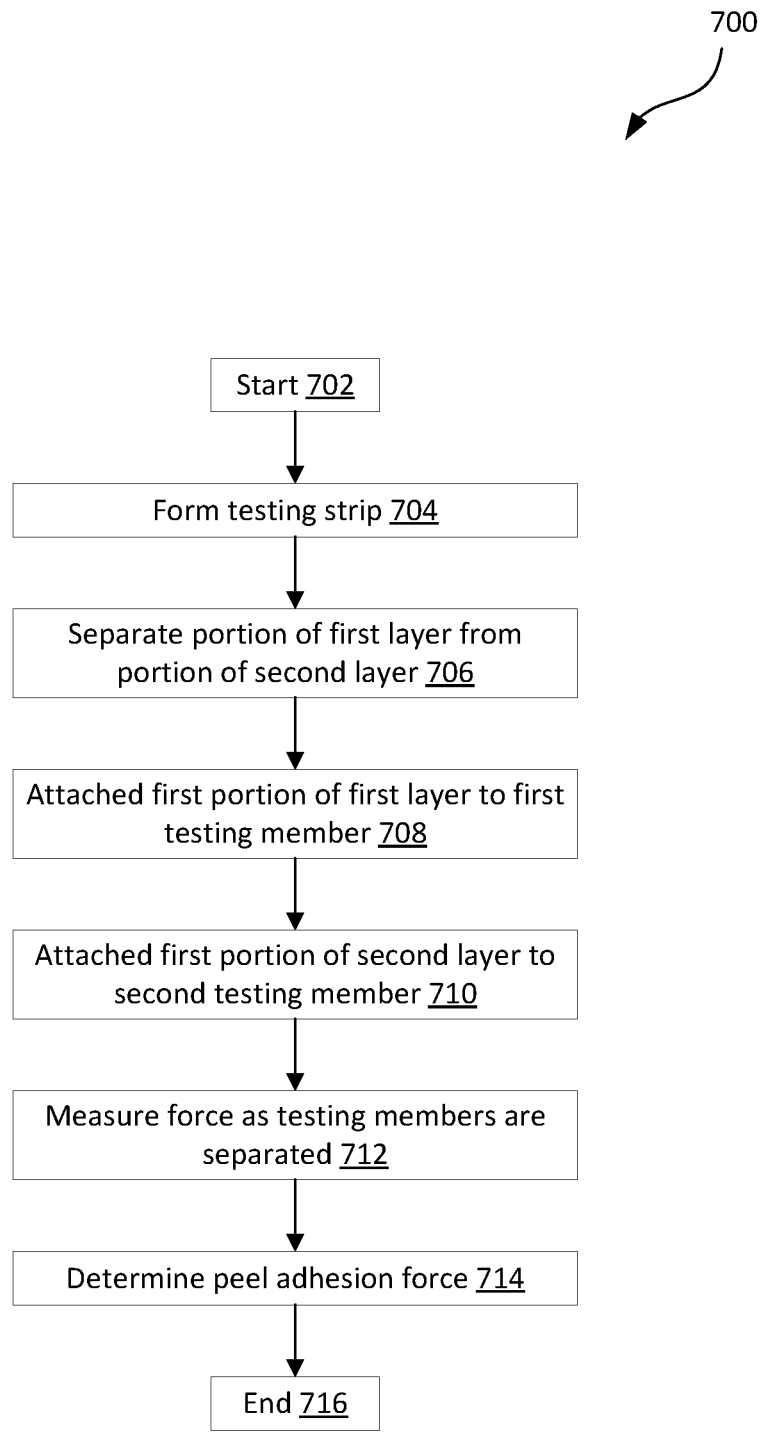
FIG. 7 illustrates a flowchart of an example testing method according to embodiments of the present disclosure.
Figure 8:
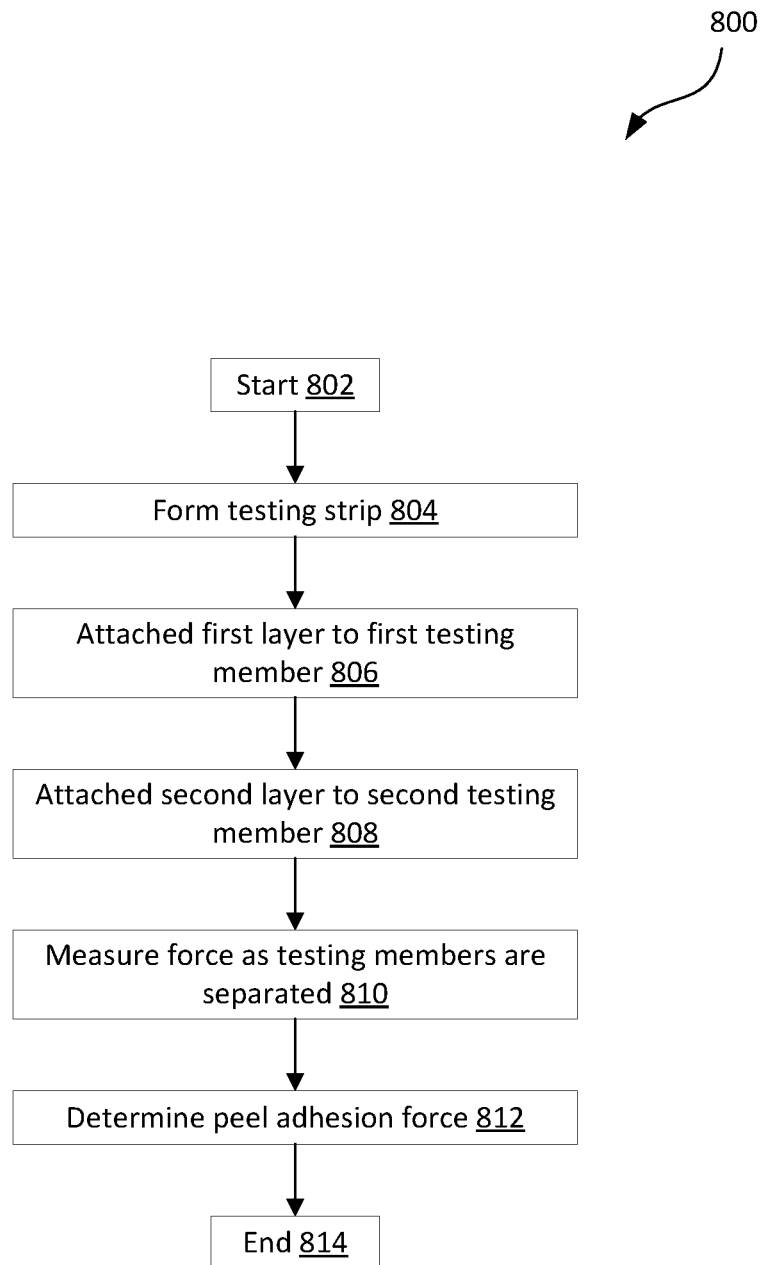
FIG. 8 illustrates a flowchart of an example testing method according to embodiments of the present disclosure.

FIGS. 7 and 8 illustrate two example methods of testing adhesion. Similar to FIG. 3 and method 300 described above, the flowcharts of FIGS. 7 and 8 may be representative of machine readable instructions that may be stored in a memory and may include one or more programs which, when executed by a processor may cause one or more computing devices to carry out one or more functions described herein. While the example program is described with reference to the flowcharts illustrated in FIGS. 7 and 8, many other methods for carrying out the functions described herein may alternatively be used. For example, the order of execution of the blocks may be rearranged or performed in series or parallel with each other, blocks may be changed, eliminated, and/or combined to perform methods 700 and 800. Further, because methods 700 and 800 are disclosed in connection with the components of other Figures of this disclosure, some functions of those components will not be described in detail below.

Method 700 begins at block 702. At block 704, method 700 includes forming the testing strip. Forming the testing strip may include cutting out a rectangular portion of a larger sheet manufactured according to the specifications described herein, including two or more layers such as paper board and PET.

At block 706, method 700 includes separating a portion of the first layer from a portion of the second layer. This may be done by separating an end of the strip, to create an edge of adhesion where the two layers meet.

At block 708, method 700 includes attaching a first portion of the first layer to a first testing member. And at block 710, method 700 includes attaching a first portion of the second member to a second testing member. The testing members may be aligned along a testing axis, and the first portions may be affixed to secured by the testing members, such that they can be pulled apart.

At block 712, method 700 includes measuring a force as the testing members are separated. This force corresponds to the force of adhesion of the two layers resisting separation. The measured force may be the force required to move the first testing member away from the second testing member.

At block 714, method 700 includes determining a peel adhesion force. The peel adhesion force may correspond to the measured force, as well as the shape and size of the testing strip, in particular the width of the testing strip and/or the width of the edge of adhesion. As such, the peel adhesion force may be a force per unit length of the edge of adhesion.

In some examples, blocks 704-714 method 700 may be repeated for a plurality of testing strips from the same or different batches of manufactured material. The results may be analyzed as a group to determine an overall peel adhesion force of the manufactured material. Method 700 ends at block 716.

Method 800 begins at block 802. One or more blocks of method 800 may be similar or identical to the blocks of method 700 in one or more respects. At block 804, method 800 includes forming a testing strip. At block 806, method 800 includes attaching a first layer to the first testing member. And at block 808, method 800 includes attaching a second layer to the second testing member.

At block 810, method 800 includes measuring a force acting on the testing member(s) as they are separated. And at block 812, method 800 includes determining a peel adhesion force based on the measured force. In some examples, blocks 804-812 may be repeated for a plurality of testing strips from the same or different batches of manufactured material. The results may be analyzed as a group to determine an overall peel adhesion force of the manufactured material. Method 800 ends at block 814.

Figure 9:
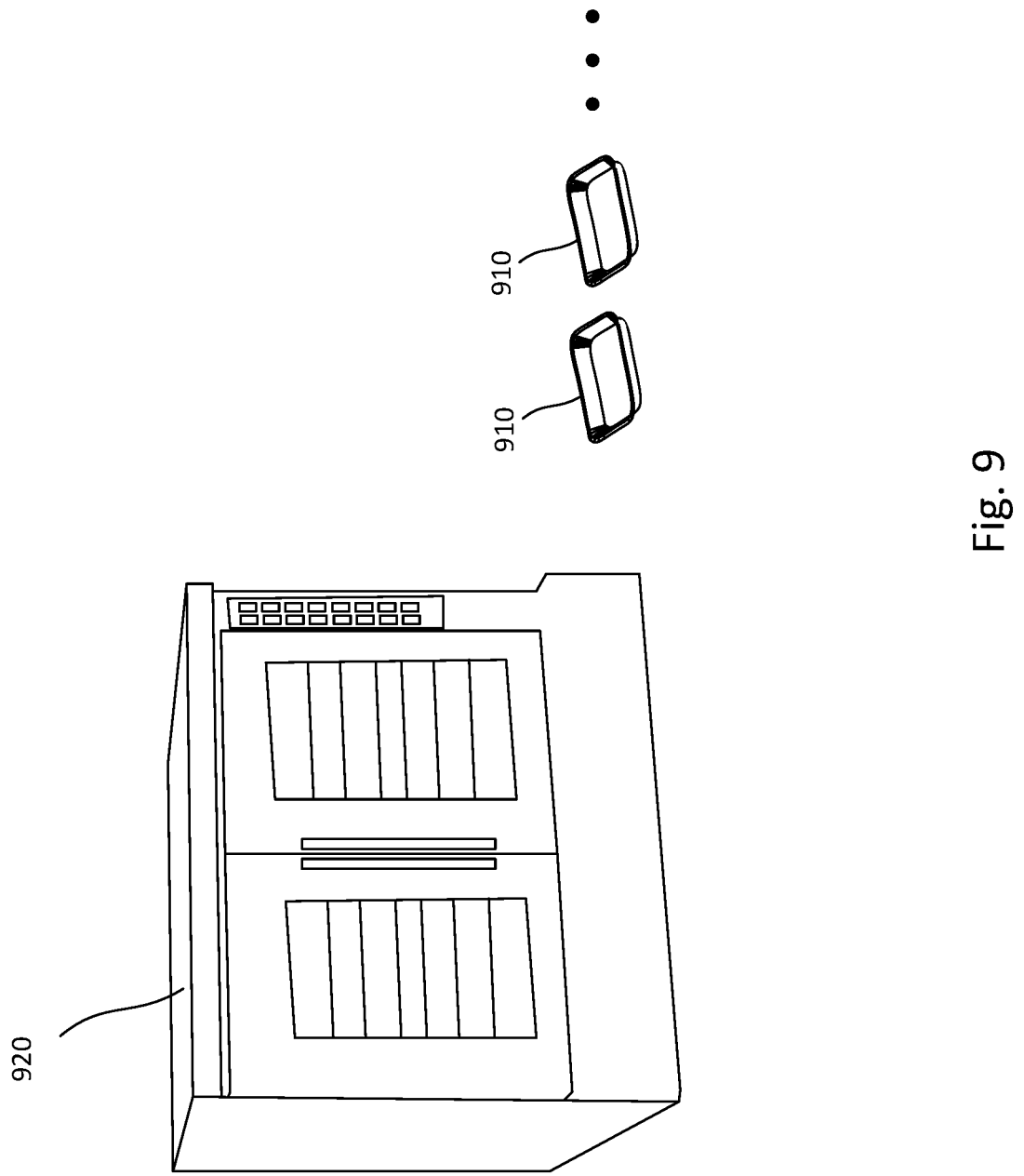
FIG. 9 illustrates an example system according to embodiments of the present disclosure.
Figure 10:
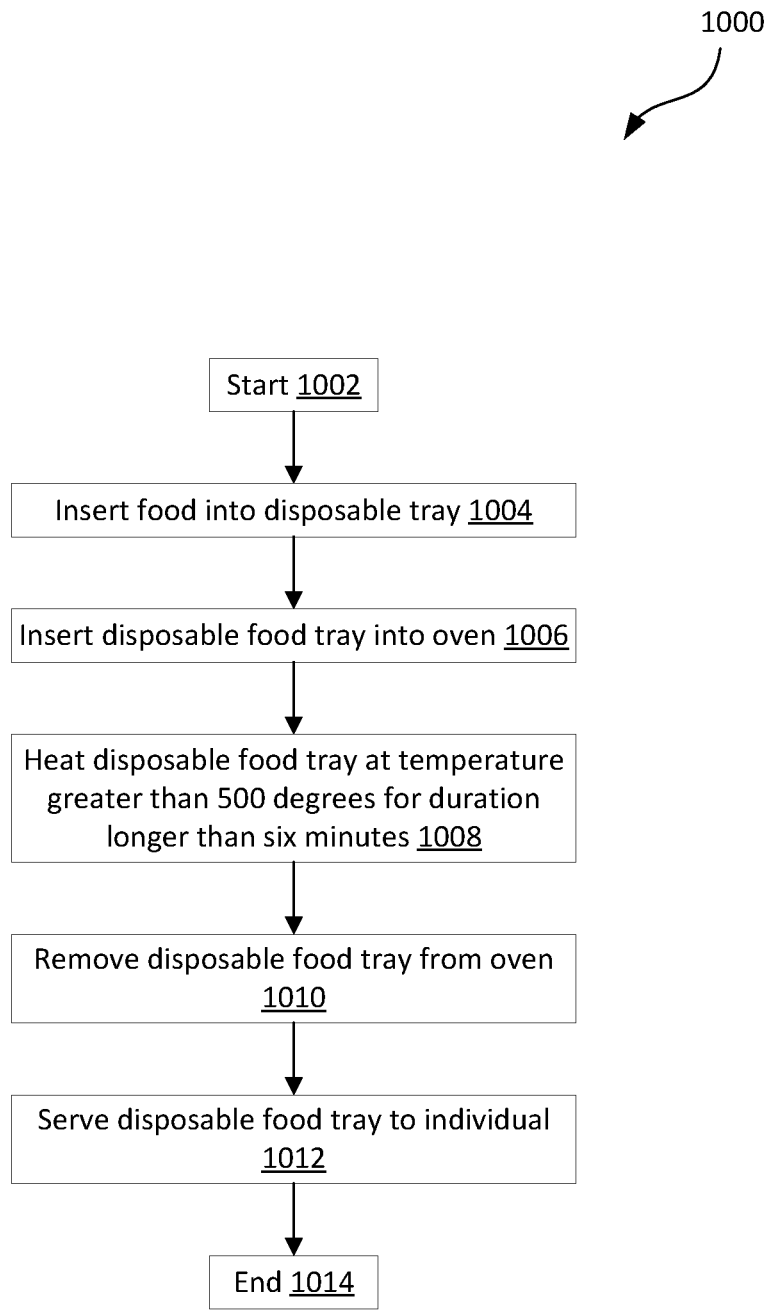
FIG. 10 illustrates a flowchart of an example method according to embodiments of the present disclosure.

FIGS. 9 and 10 correspond to methods and systems for using the disposable food tray described in this disclosure. FIG. 9 illustrates an accelerated cooking over 920 and a plurality of disposable food trays 910.

The disposable food tray 910 of FIG. 9 may be similar or identical to the disposable food tray 100 described herein, including a first layer and a second layer that are affixed to each other. The accelerated cooking oven 920 can be any food preparation device configured to heat its contents to greater than 500 degrees for longer than six minutes. Both the temperature and the time of heating may be variable, and may be set by a person or device controlling the oven 920.

In some examples, the oven 920 is configured to heat the tray(s) 910 to up to 525 degrees for up to five minutes without any blistering occurring in the tray(s) 910.

In some examples, the oven 920 is configured to heat a plurality of disposable food trays 910 at the same time, or in rapid succession. The oven may be configured for rapid successive heating cycles, and the trays may be configured to withstand temperatures up to 525 degrees for up to longer than six minutes.

FIG. 10 illustrates an example method 1000 of using the disposable food tray described in this disclosure. Similar to FIGS. 3, 7, and 8 and methods 300, 700, and 800 described above, the flowchart of FIG. 10 may be representative of machine readable instructions that may be stored in a memory and may include one or more programs which, when executed by a processor may cause one or more computing devices to carry out one or more functions described herein. While the example program is described with reference to the flowchart illustrated in FIG. 10, many other methods for carrying out the functions described herein may alternatively be used. For example, the order of execution of the blocks may be rearranged or performed in series or parallel with each other, blocks may be changed, eliminated, and/or combined to perform method 1000. Further, because method 1000 is disclosed in connection with the components of other Figures of this disclosure, some functions of those components will not be described in detail below.

Method 1000 starts at block 1002. At block 1004, method 1000 includes inserting food into the disposable tray. The disposable tray may be the layered tray disclosed herein with reference to the other Figures. As such, the tray may include a first layer comprising a paper board, and a second layer comprising PET affixed to the first layer.

In some examples, the adhesion between the first and second layer of the disposable tray may be configured to withstand temperature of up to 525 degrees for durations of up to five minutes or more, without blistering occurring between the layers.

In some examples, the disposable food tray may further comprise a moisture barrier layer configured enable moisture in the disposable food tray to escape without blistering occurring. This moisture may be the inherent moisture of the first layer, second layer, or any other layer of the tray.

At block 1006, method 1000 includes inserting the disposable food tray into the oven. Then at block 1008, method 1000 includes heating the disposable food tray in the oven at a temperature up to 525 degrees for a duration up to six minutes. In some examples, the disposable tray may be heated at other temperatures and for other durations. For instance, in one example the tray may be heated at a temperature of greater than 500 degrees for a duration longer than five minutes without blistering occurring between the layers of the tray.

At block 1010, method 1000 includes removing the disposable food tray from the oven, and at block 1012 method 100 includes serving the disposable food tray to an individual.

In some examples, method 1000 may be performed for a plurality of disposable food trays at the same time or in rapid succession. This is particularly useful for a service location with high turnover and serving a high number of customers. In these cases, the method includes reducing an overall processing time or preparation time of the plurality of disposable food trays containing food. For example, where a traditional disposable food tray may be limited to 400 degrees, the cooking time may be determined to be 10 minutes under a standard industry practice guideline. As such, where only one tray is prepared at a time, the throughput of the oven may be six trays per hour at best. But if the temperature can be increased to 525 degrees and the cooking time reduced to six minutes, the throughput may be increased to ten trays per hour. This increase in throughput may be due to the reduced time required for heating the food, due to the improved ability of the disposable tray to withstand high temperatures.

In some examples, method 1000 may include additional or alternative steps. For example, method 1000 may include a preliminary step of placing food into a disposable food tray. This can be done by placing the tray on an automated or manned line configured to insert food into the tray. The tray including the food may then be sealed with a film to preserve the food and prevent air or other contaminants from entering the food. The sealed tray may then be blast frozen, frozen, refrigerated, thawed, or stored in an ambient temperature state. The tray may then be transported to a food service location, where it is heated up to a temperature of 500 degrees for a duration up to 6 minutes. The seal on the tray may be removed prior to or after heating. A lid may then be placed on the tray, and the heated food and tray may then be served to an individual.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A method of testing adhesion comprising:
    forming a strip comprising a first layer affixed to a second layer;
    separating a first portion of the first layer from a first portion of the second layer;
    attaching the first portion of the first layer to a first testing member;
    attaching the first portion of the second layer to a second testing member;
    measuring a force applied as the first member is drawn away from the second member during a first stage, a second stage following the first stage, and a third stage following the second stage, wherein the first member is drawn away from the second member a distance of 70 mm at a rate of 2 mm/s; and
    determining a peel adhesion force between the first layer and the second layer based on the measured force during the second stage.

2. The method of claim 1, wherein the first layer is paper board, and wherein the second layer is polyethylene terephthalate (PET).

3. The method of claim 1, wherein an angle between the first portion of the first layer and the first portion of the second layer is 180 degrees.

4. The method of claim 1, wherein the first member and the second member are aligned along a testing axis.

5. The method of claim 4, wherein the first member is drawn away from the second member along the testing axis.

6. The method of claim 1, further comprising producing an edge of adhesion between the first layer and the second layer, wherein the edge of adhesion is a straight line.

7. The method of claim 6, wherein the edge of adhesion is perpendicular to a testing axis along which the first and second members are aligned.

8. The method of claim 1, wherein measuring the force applied comprises drawing the first member away from the second member, and measuring the force applied during movement of the first member.

9. The method of claim 1, wherein determining the peel adhesion force based on the measured force applied comprises determining an average force applied during the second stage.

10. The method of claim 1,
wherein the first stage comprises a first 5 seconds during which the first member is drawn away from the second member, the second stage comprises a next 25 seconds following the first stage, during which the first member is drawn away from the second member, and the third stage comprises a next 5 seconds following the second stage, during which the first member is drawn away from the second member.

11. A method of testing adhesion comprising:
forming a strip comprising a first layer affixed to a second layer;
attaching the first layer to a first testing member;
attaching the second layer to a second testing member;
measuring a force applied as the first member is drawn away from the second member during a first stage, a second stage followed the first stage, and a third stage following the second stage, wherein the first member is drawn away from the second member a distance of 70 mm at a rate of 2 mm/s; and
determining a peel adhesion force between the first layer and the second layer based on the measured force during the second stage.

12. The method of claim 11, wherein the first layer is paper board, and wherein the second layer is polyethylene terephthalate (PET).

13. The method of claim 11, wherein an angle between the first layer and the second layer is 180 degrees.

14. The method of claim 11, wherein the first member and the second member are aligned along a testing axis, and where the first member is drawn away from the second member along the testing axis.

15. The method of claim 11, further comprising producing an edge of adhesion between the first layer and the second layer, wherein the edge of adhesion is a straight line and is perpendicular to a testing axis along which the first and second members are aligned.

16. The method of claim 11, wherein measuring the force applied comprises drawing the first member away from the second member, and measuring the force applied during movement of the first member.

17. The method of claim 11, wherein determining the peel adhesion force based on the measured force applied comprises determining an average force applied during the second stage.

18. The method of claim 11, further comprising:
wherein the first stage comprises a first 5 seconds during which the first member is drawn away from the second member, the second stage comprises a next 25 seconds following the first stage, during which the first member is drawn away from the second member, and the third stage comprises a next 5 seconds following the second stage, during which the first member is drawn away from the second member.

19. A method for determining whether a disposable food tray can withstand a temperature of up to 525 degrees Fahrenheit for up to six minutes without blistering, the method comprising:
forming a strip comprising a first layer affixed to a second layer;
separating a first portion of the first layer from a first portion of the second layer;
attaching the first portion of the first layer to a first testing member;
attaching the first portion of the second layer to a second testing member;
measuring a force applied as the first member is drawn away from the second member; and
determining a peel adhesion force between the first layer and the second layer based on the measured force,
wherein a peel adhesion force of greater than 60 grams per inch indicates that a disposable food tray comprising material of the first layer and the second layer can withstand temperatures of up to 525 degrees Fahrenheit for up to six minutes without blistering.

20. The method of claim 19, wherein the first member is drawn away from the second member a distance of 70 mm at a rate of 2 mm/s.

21. The method of claim 19, the first member is drawn away from the second member during a first stage, a second stage following the first stage, and a third stage following the second stage; and the peel adhesion force between the first layer and the second layer is based on the measured force during the second stage.

* * * * *